United States Patent [19]

Strick

[11] Patent Number: 5,678,965

[45] Date of Patent: Oct. 21, 1997

[54] CORE ROUTER AND METHOD

[75] Inventor: Joseph A. Strick, Combined Locks, Wis.

[73] Assignee: Appleton Papers Incorporated, Appleton, Wis.

[21] Appl. No.: 619,222

[22] Filed: Mar. 21, 1996

[51] Int. Cl.⁶ .................................................. B23C 3/12
[52] U.S. Cl. .................... 409/132; 29/33 T; 409/131; 409/138; 409/179; 409/181; 409/182; 144/136.95; 144/154.5; 144/371
[58] Field of Search ........................ 29/33 T; 409/131, 409/132, 182, 181, 179, 138; 144/371, 136.95, 154.5

[56] References Cited

U.S. PATENT DOCUMENTS

| | | | |
|---|---|---|---|
| 3,289,717 | 12/1966 | Dutot | 144/154.5 |
| 3,360,023 | 12/1967 | Rutzebeck | 144/154.5 |
| 3,581,787 | 6/1971 | Bane | 409/182 |
| 3,924,743 | 12/1975 | Bittner | 206/389 |
| 4,149,680 | 4/1979 | Whatley | 242/55.2 |
| 4,566,512 | 1/1986 | Wilson | 144/154.5 |
| 4,738,571 | 4/1988 | Olson et al. | 409/182 |
| 4,865,093 | 9/1989 | Ford et al. | 409/178 |
| 5,265,657 | 11/1993 | Matsumoto et al. | 144/371 |
| 5,503,203 | 4/1996 | Stornetta | 409/182 |
| 5,509,454 | 4/1996 | Giacometti | 409/182 |
| 5,562,394 | 10/1996 | Brown | 414/626 |

*Primary Examiner*—Daniel W. Howell
*Assistant Examiner*—Christopher Kirkman
*Attorney, Agent, or Firm*—Birch, Stewart, Kolasch & Birch, LLP

[57] ABSTRACT

A device and method are provided for reducing a length of an annular core on which a roll is mounted. If the core extends beyond the end of the roll, the roll is unstable when it is stacked. This device and method will trim the length of the core extending beyond the end of the roll to provide a flat face across the entire end of the roll. A stable stacking arrangement will therefore be ensured. The router includes a collar, a router bit and a transparent disk or plate mounted thereon. The router bit will chip away the portion of the core which extends beyond the end of the roll. A vacuum can be operatively attached to the router in order to remove chips formed by the router bit. The collar on the router will keep the bit spaced from the roll to prevent damage to the roll. This collar and the transparent disk or plate will also aid in guiding the router.

14 Claims, 4 Drawing Sheets

CORE ROUTER AND METHOD

BACKGROUND OF THE INVENTION

1. Field of the Invention

The present invention relates to a hand-held router for trimming a core on which a roll is mounted. Also, a method of using this router to trim the core is disclosed.

2. Description of the background

It is the practice in many paper mills to stack huge jumbo rolls on end in order to maximize storage space. A large roll is wound around a core. The core has an annular shape and is used for handling purposes. For example, a steel rod or other guide is inserted through the cores at each end of the roll during winding or unwinding of the roll.

Problems arise when the core is not flush with the end of the paper roll. When the paper is stacked on end, the entire roll of paper tends to be unstable. In fact, some mills have had unfortunate experiences with jumbo rolls of paper tipping and crashing through walls and other structures.

In order to stabilize stacked rolls, the core inserted into the roll should be flush with or should be inside of the end of the core. If the length of the core extends beyond the end of the roll, then an unstable stacking situation can arise.

In the past, when the edge of a roll did not match the core, it has been the practice to rewind the roll. In other words, when cores are misaligned with the end of the roll, the rolls are rewound such that the face of the core will be repositioned to match the end face of the roll. This results in multiple handling of the paper and is not cost effective.

It is therefore desired to eliminate this rewinding step while obtaining stackable rolls. Such rolls are mounted on a core which is flush with or is positioned inside both ends of the roll.

SUMMARY OF THE INVENTION

Accordingly, it the primary object of the present invention to provide a method and device for making cores flush with or positioned inside ends of the rolls.

A further object of this method and device is to avoid damaging the paper of the roll.

It is another object of the present invention to provide a device and method which eliminates the need for rewinding of rolls as has been done in past practice.

It is a further object of the present invention to provide a device and method which is easy to use, inexpensive and fast.

These and other objects of the instant invention are fulfilled by a method for trimming an annular core with a centrally disposed opening. The core is positioned in a hole in a roll and a router with a router bit and collar are provided. The collar is placed in the opening of the core. The router is then moved over a portion of the core which extends beyond the roll. The collar will guide the router bit during this moving and a portion of the core which extends beyond the roll will be chipped away by the router bit. Therefore, a length of the core in an area of the portion which extends beyond the roll is reduced during the step of removing.

These and other objects of the present invention are also fulfilled by a device for trimming an annular core with a centrally disposed opening. The roll is positioned on the core, and the device comprises a router with a router bit and collar. The router bit is rotatably mounted on the router and is rotatably driven by the router to remove a portion of the core extending beyond the roll when the collar is inserted into the opening in the core. The collar engages a side of the opening in the core when the router bit removes the portion of the core to thereby guide the router. A guide plate is mounted on the router. The guide plate has a centrally disposed opening with the router bit and collar extending therethrough. Means for discharging chips formed from the portion of the core removed by the router are provided. The means for discharging includes a suction channel disposed between the guide plate and router. The suction channel extends from the centrally disposed opening of the guide plate.

These and other objects of the present invention are further fulfilled by a combination of a core and a device for trimming the core. The combination comprises an annular core with a centrally disposed opening. The roll is mounted on the core. The combination further comprises a device for trimming. This device has means for removing a portion of the core which extends beyond the roll and means for discharging waste produced by the means for removing. The means for removing reduces length of the core which extends beyond the roll. The means for discharging uses suction to remove waste produced by the means for removing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
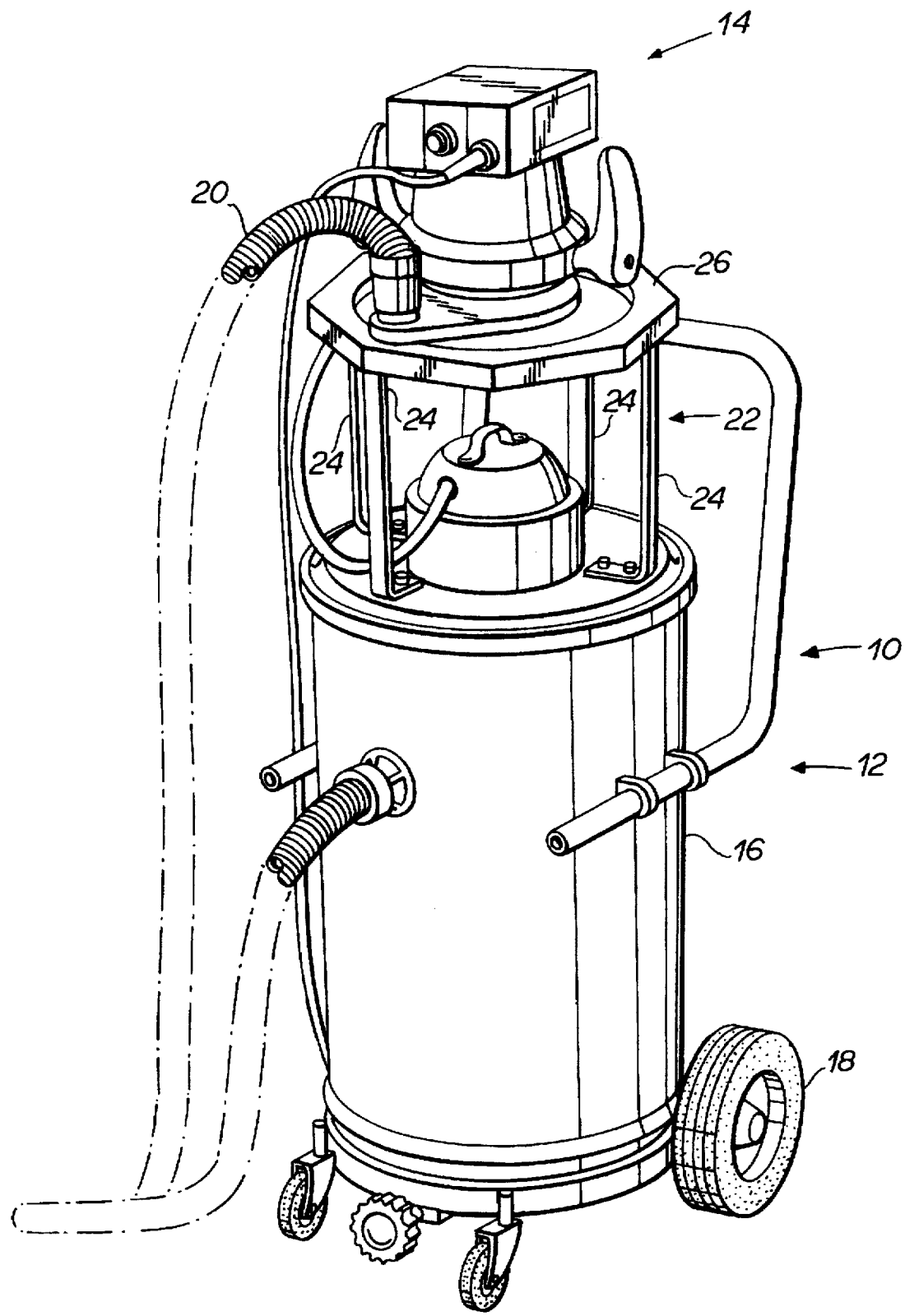
FIG. 1 is a perspective view of the device for trimming a core according to the present invention.

Referring in detail to the device and with particular reference to FIG. 1, the device 10 for trimming a core is shown. This device 10 includes means 12 for discharging chips or waste and means 14 for removing.

First, the means 12 for discharging chips or waste will be described. This means includes a vacuum 16. Such a vacuum 16 can include a shop vacuum or other conventional vacuum canister. Wheels 18 can be provided on the vacuum 16 in order to aid in its movement. The vacuum 16 includes a vacuum hose 20. The hose 20 connects the vacuum 16 to the means 14 for removing.

A platform 22 is on top of the vacuum 16 is a platform 22. This platform 22 includes support legs 24 extending from support surface 26 to the top of the vacuum 16. A centrally disposed opening (not shown) can be provided on support surface 26 in order to receive a portion of the means 14 for removing as will be described later. This support surface 26 can be a wooden structure or other suitable arrangement. The platform 22 merely provides a convenient place to rest the means 14 for removing. Of course, this platform 22 can be omitted if so desired.

The continuous hose 20 between the vacuum 16 and the means 14 for removing can be detached from both the vacuum 16 and means 14. Of course, this hose can also be rigidly mounted to either or both of these elements.

Figure 2:
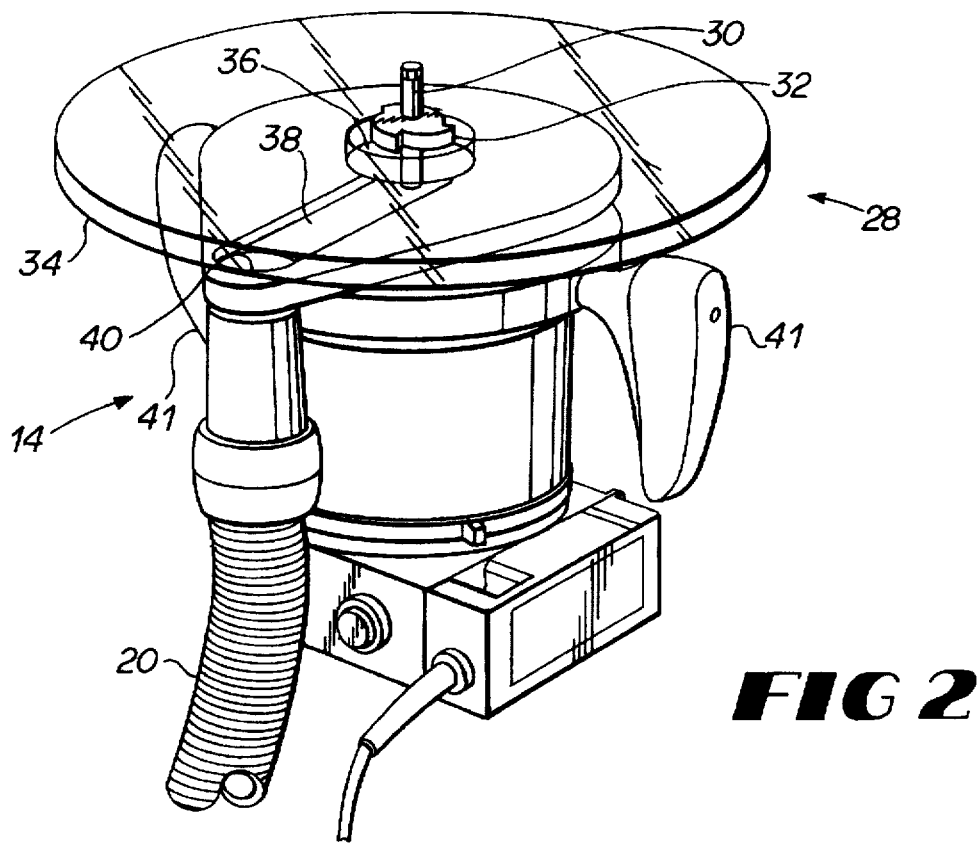
FIG. 2 is a perspective view of a portion of the device of FIG. 1 showing the router of the present invention.

Turning now to FIG. 2, the means 14 for removing will be described in greater detail. This means 14 includes a router 28. Because a conventional router can be modified as will be described below, the details of this router 28 will not be set forth. The router 28 includes a collar 30 and a router bit 32. The collar 30 and router bit 32 are simultaneously rotated by the router. Alternatively, the collar 30 can be designed to be stationary while the bit 32 is rotated. This bit 32 is rotated by a conventional driving arrangement within the router 28.

On an upper surface of router 28, a generally circular transparent disk or guide plate 34 is provided. This guide plate 34 can be made from Lucite™ or other rigid transparent material. Of course, if the disk or guide plate 34 did not need to be transparent, then metal or any other suitable material can be used for the plate 34. A centrally disposed opening 36 is provided in the disk or guide plate 34. The collar 30 and router bit 32 extend through the centrally disposed opening 36. While some space is shown between the edge of the opening 36 and the router bit 32, it should be apparent that the amount of space can be varied. It is merely necessary for the space to be sufficiently sized such that waste produced by the router bit can be moved therethrough for discharge as will be described below.

Figure 3:
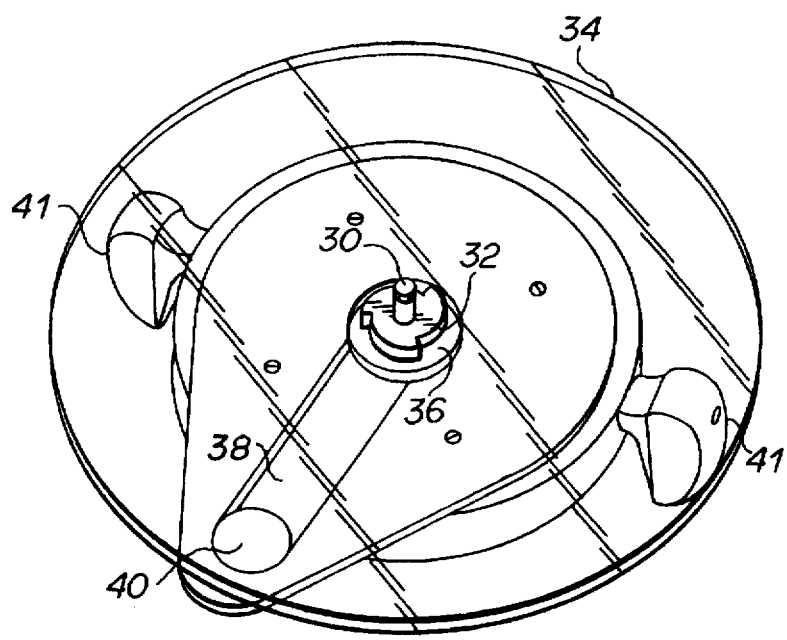
FIG. 3 is a perspective view of the end face of the router of the present invention.

As seen in FIGS. 2 and 3, a suction channel 38 extends from the centrally disposed opening 36 to a connection port 40 for the vacuum hose 20. The suction channel 38 is between disk or plate 34 and the router 28. The disk or plate 34 and the router 28 are sufficiently closed to enable vacuum pressure from vacuum 16 to suck waste away from opening 36. This waste can be produced by the rotating router bit 32 chipping away a portion of a core 48. These chips will move through the centrally disposed opening 36, the suction channel 38 and connection port 40 into the vacuum hose 20. Therefore chips or similar waste material produced by the router bit 32 can be discharged from the area adjacent the router bit. This operation will be described in more detail below.

Handles 41 are provided on the router 28. An operator can grip these handles when operating the router 28.

Figure 4:
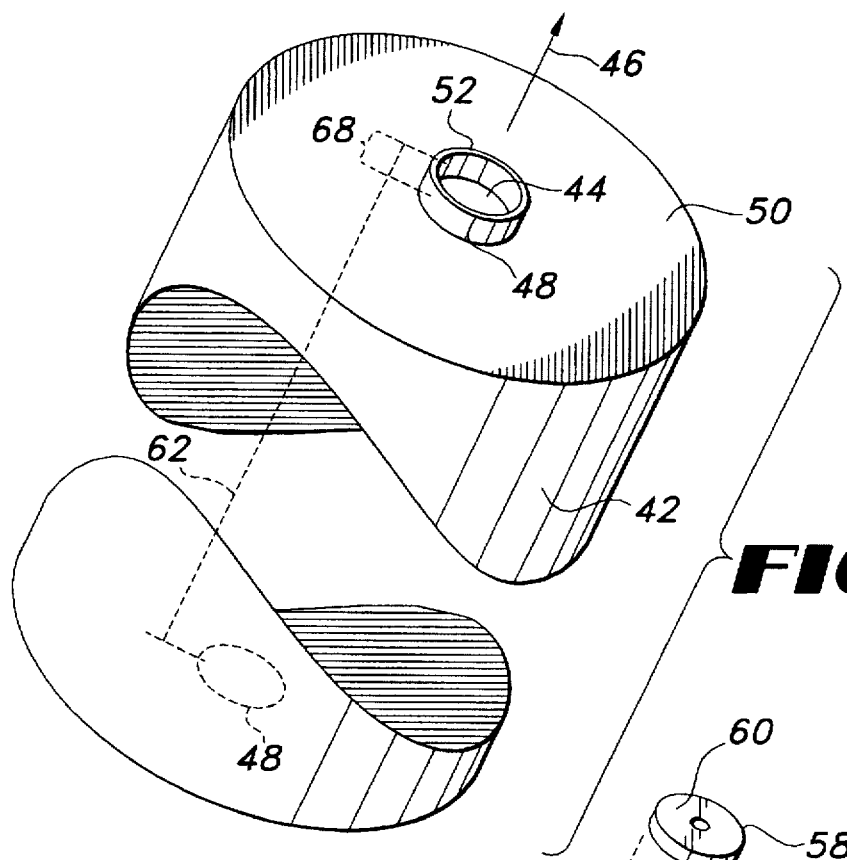
FIG. 4 is a perspective view of a section of a roll with a core extending beyond the end of the roll.

In FIG. 4, a roll 42 is shown. This roll 42 can be a roll of paper or any other material. A core 48 with a central hole 44 extends through the roll 42. The longitudinal axis 46 of the roll 42 is aligned with the central hole 44.

The core 48 should terminate within or adjacent to the end 50 of the roll 42. This core 48 can be made of wood, paper, plastic or any other suitable material. In FIG. 4, the core 48 is shown misaligned with the end 50 of roll 42. In normal operation, the end face 52 of the core 48 is parallel with the end 50 of the roll 42. This face 52 can be generally in the same plane as end 50 or the face 52 can be inserted into the central hole 44 of the core 42 such that the core does not extend beyond end 50. However, it is possible that the core 48 can become misaligned as shown in FIG. 4. This misalignment therefore provides an unstable stacking arrangement when roll 42 is placed on end 50 or when another roll is stacked on this end 50.

It should be appreciated that the core 48 has two ends with the central hole 44 extending completely through the roll. Therefore, there is an annular core end face 52 at each end of the roll. Either one or both of these end faces 52 can be misaligned as shown in the FIG. 4 arrangement. If, however, only one end of the core is misaligned, then the trimming operation of the instant invention as will be described below need only be done on this misaligned end.

It should be noted that the positioning of the core 48 in FIG. 4 is exaggerated in order to show the misalignment feature. In order for a core 48 to be considered as being misaligned, it is simply necessary for a portion of the core 48 to extend beyond the end 50 of the roll thereby resulting in a possible unstable stacking arrangement. Moreover, it should be noted that if a roll 42 only has one misaligned core 44, the roll can rest on its other end and no trimming of the core 48 is necessary if no further material is to be stacked on the upper end of the roll with the misaligned core. Nonetheless, a trimming operation can be carried out in such an arrangement is so desired. It is contemplated that when the end 50 of roll 42 has a misaligned core and the roll is to rest on that end or another roll is to be stacked on that end, then the trimming operation will be carried out as will be described below.

Figure 5:
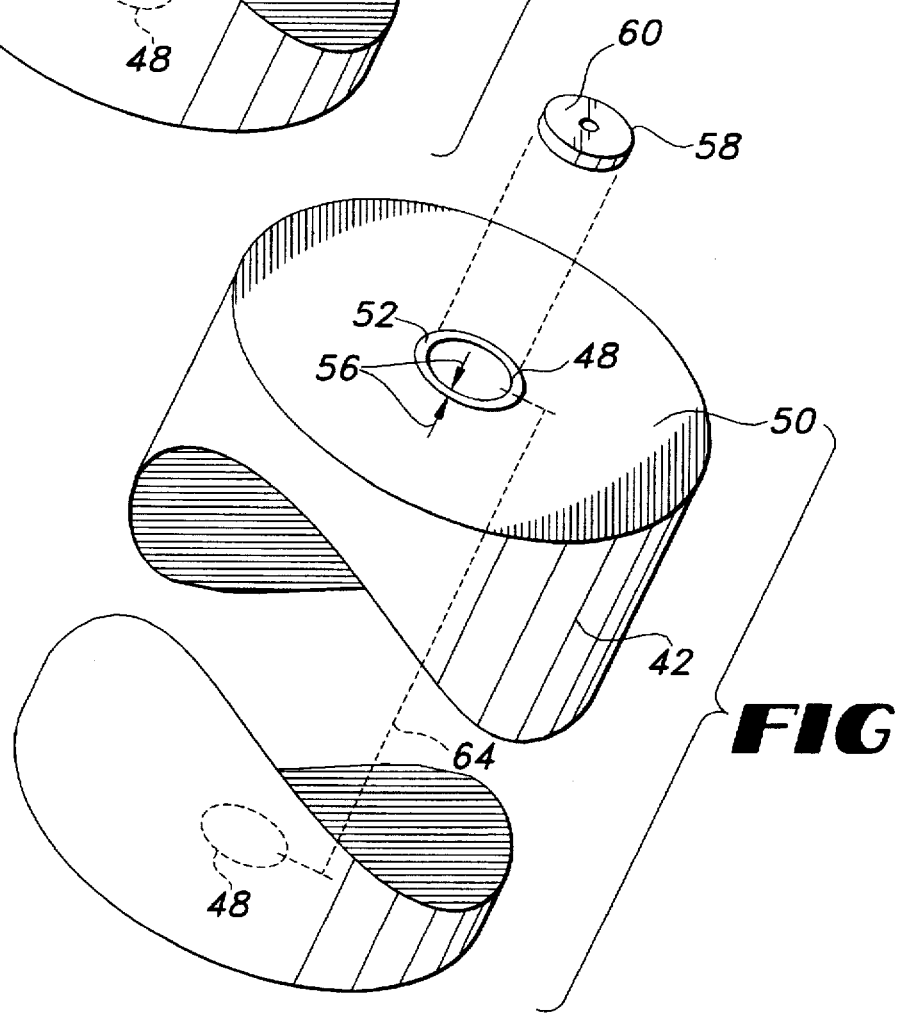
FIG. 5 is a perspective view of the roll of FIG. 4 after the core is trimmed and prior to insertion of a core plug.

Turning to FIG. 5, the core 48 has been trimmed to have its end face 52 flush with the end 50 of roll 42. An annular core plug 58 can be hammered or otherwise place in the central hole 44 of the core. The outer face 60 of the core plug 58 would be flush with the end face 50 of the roll 42. Alternatively, the core plug 58 can be inserted well within core 48 such that its outer face 60 is recessed from the roll's end face 50. The core 48 has an annular shape with the centrally disposed opening 44. The core has a predetermined thickness 56. This core in FIG. 4 is uncut or untrimmed. The eventual trimming operation will be described in more detail below. The trimmed end face 52 of the core is generally flat and planar.

Figure 6:
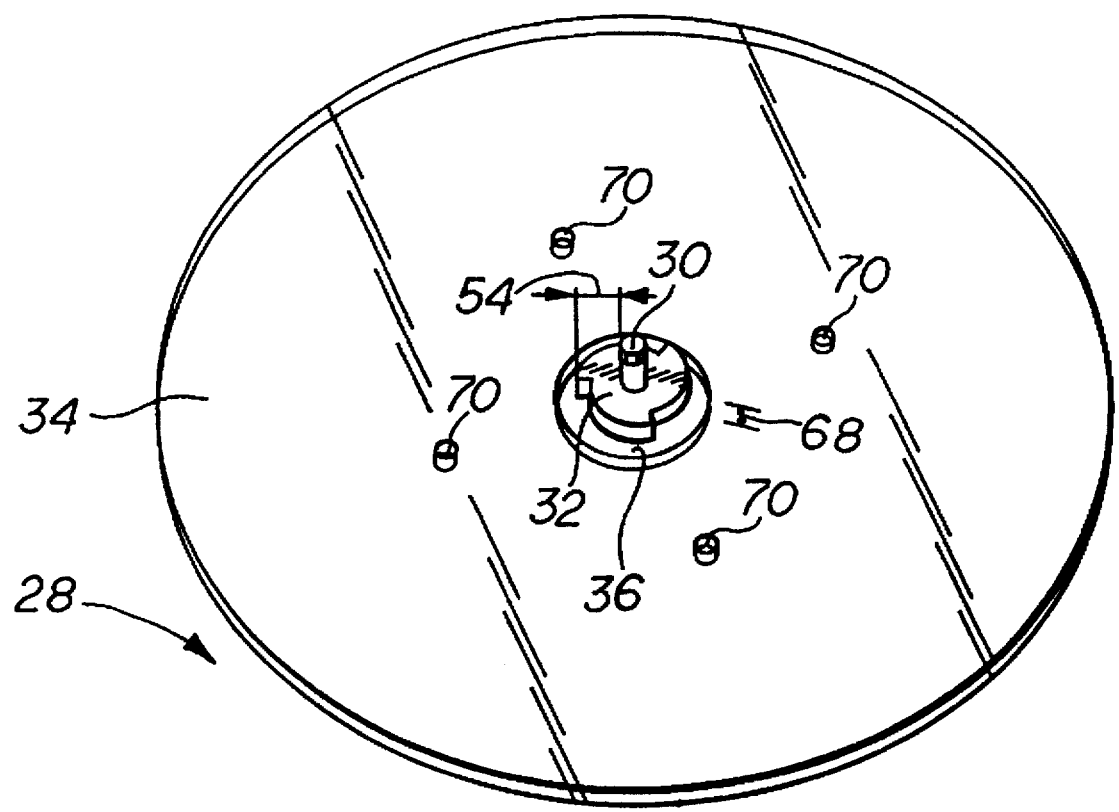
FIG. 6 is an end perspective view of the router showing the router bit, collar and guide plate of the present invention.

In FIG. 6, an end face of the router 28 and disk or guide plate 34 is shown. A thickness 68 of the router bit 32 is indicated in this figure. This router bit thickness 68 will extend above the outermost face of the disk or guide plate 34. It should be noted that the disk or guide plate 34 is rigidly mounted on the router such as through screws 70. The maximum width 54 of the router bit from the collar 30 to the bit's outer edge is also indicated in FIG. 6.

The trimming operation to reduce length of the core 48 from the first length 62 to the second length 64 will now be described. When the roll 42 is initially mounted on the core 48, the core 48 can extend beyond the end 50 of the roll. This can result in an unstable stack of rolls as noted above. It is important for the core to be flush with end 50 or contained within the hole of the roll 42. In the described embodiment, the length of the misaligned core will be reduced to a second predetermined length 64 which is less than the original length 62 of the core. It is simply desired that the core does not extend beyond the end 50 of the roll. It should be noted that if the core 48 was originally flush with or slightly recessed in the opening of the roll, it is still possible to use the instant invention if the length of all or a portion of the core was to be further reduced for some reason.

To reduce the length of the core 48, an operator removes the router 28 from the platform 22 on the vacuum 16. The handles 41 of the router can be gripped by the operator. The face of the disk or guide plate 34 will then be placed against the end 50 of the roll 42. The core 48 is nonmovably mounted in the hole of the roll 42.

The router 28 can then be turned on to drivingly rotate the router bit 32. This router bit 32 has a predetermined length 68 extending above the face of the plate 34. Therefore, the router bit 32 can remove at least this length 68 of the core 48. It should be appreciated that the thickness 68 of the radial bit extending about disk or guide plate 34 is added to the length 68 to determine a total length of core removed. Due to this extra thickness 68, the end face 52 of the core can actually be slightly recessed from the end 50 of the roll 42. This distance 68, however, is somewhat insignificant and the roll end 50 can be considered to be flush with the face 52 of the core.

The maximum width 54 of the router bit from the collar 30 to the bit's outer edge can be set to generally equal the thickness of the wall of core 48. In that way, the router bit 32 will not engage the roll 50. The bit 52 will have a sufficient thickness to remove the core yet avoid damage to the paper of the roll. Of course, this distance 54 can exceed of the thickness of the wall of the core 48. However, the extra thickness of the bit beyond the thickness of the wall of the core 48 should be minimized in order to reduce damage to the end face of the roll of paper.

In this regard, to protect the end 50 of the roll 42, the collar 30 used. This collar is positioned within the core opening 44 to prevent the router bit 32 from engaging the roll 42. Damage to the paper or material of the roll by the router bit 32 can therefore be avoided or at least minimized.

While holding the handles 41, the operator can encircle the collar 30 around opening 44 of the core 48. The router bit 32 will chip away the core 48. The length of the core will therefore be reduced from the first length 62 to the second length 64. The disk 34 will initially engage the face 52 of the core. This disk 34 will be spaced from the end 50 of roll 42 by length 68. As the router bit 32 rotates, the core 48 will be chipped away. While length 62 is reduced, the total amount of length of core 48 removed is controlled by the disk or plate 34. In particular, when the disk or plate 34 comes to rest on the end 50 of the roll 42, no further length of core 48 can be removed from that end of the roll. Accordingly, the disk 34 engaging the end 50 of roll 42 will limit the amount of the core 48 which the router bit 32 can reach and therefore limit the amount of core length removed. This amount of length removed is dependent also on the degree to which core 48 is misaligned. For example, the core 48 which only extend a small amount from the end 50 of roll 42 has a lesser length removed than a core which originally extends further from end 50.

The collar 38 provided on the router bit 32 will engage the side of the opening 56. This collar will help guide the router 28 and keep bit 32 out of contact with the roll 42 as noted above.

Because the disk or guide plate 34 can be transparent, an operator can easily see the area on which the router 28 is working. This also helps to ensure avoidance of damage to the roll.

While grasping the handles 41, the operator will move the router 28 to reduce length of the core 48 as noted above. The orientation of the handles 41 and router 28 will not change as the router 28 chips away core 48. The router bit 32 and the collar 30 are generally maintained parallel to the longitudinal axis 46 of the roll 42. The operator will grip the handles and moves the router 28 with a circular motion. Twisting of the router by the operator is unnecessary when moving the router 28 around core 48.

As the operator moves the router 28, the wood, paper, plastic or other material of the core 48 will be chipped away. The waste is sucked through the centrally disposed opening 36, the suction channel 38, the connection port 40 and the vacuum hose 20 by the vacuum 16. Therefore, waste can be efficiently removed in the instant invention.

In operation, the router 28 will trim a core 48 positioned in a central hole of the roll 42. The router has a router bit 32 and collar 40. The collar 30 is inserted into the opening 56 of the core 48. The router 28 is then moved over a portion of the core which extends beyond the end 50 of the roll 42. The router bit 32 is guided by collar 30 within the core opening 56. A length 57 of the core is removed. The removed portion originally extends beyond the end 50 of roll 42. The original length 62 of the core 48 is reduced to a second length 64. Therefore, the core will no longer extend beyond the end 50 of roll 42 after this trimming step.

Rather than manually moving the router, it should be appreciated that an automatic device could be used. For example, a machine can be provided for moving the router 28 to chip away core 42. A manual operation, however, is relatively simple and can therefore be relatively inexpensive.

With this device and method, it is possible to reduce the length of the core such that the core is flush with the end 50 or is contained within the hole of roll 42. Problems occurring when stacked rolls have misaligned cores can be avoided. A stable stack can easily be obtained with this device and method. This will eliminate the need for rewinding rolls on the cores when the cores extend beyond the rolls. This results in substantial dollar savings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for trimming an annular core with a centrally disposed opening, a roll of paper being mounted on the core, the method comprising the steps of:

providing a router with a router bit and collar;

placing the collar in the opening of the core;

moving the router over a portion of the core which extends longitudinally beyond the roll;

guiding the router bit with the collar in the core opening during the step of moving;

protecting the roll of paper from the router bit during the step of guiding by preventing the router bit from cutting into the paper; and removing the portion of the core which extends longitudinally beyond the roll with the router during the step of moving the router, a length of the core which extends longitudinally beyond the roll being routed during the step of removing.

2. The method as recited in claim 1, wherein the step of protecting the roll from the router uses the collar, the router bit being rotatably mounted on the router and having a width less than or equal to a maximum width of the core, the router bit being rotatable during the step of removing and due to the width thereof and to the router bit engaging a side of the opening in the annular core, the router bit failing to engage the roll whereby the roll is protected from the router.

3. The method as recited in claim 2, wherein the core generally has a uniform thickness and wherein the step of removing only reduces the length of the core.

4. The method as recited in claim 1, further comprising the steps of:
 providing a disk on the router, the disk having a generally circular shape and a centrally disposed opening therein, the router bit and collar extending through the centrally disposed opening in the disk; and
 guiding the router during the step of rotating with the disk and the collar, the disk engaging an end of the roll and the collar engaging a side of the opening in the annular core.

5. The method as recited in claim 4, further comprising the step of inspecting the core during the step of removing, the disk being transparent to permit visual inspection of the core during the step of removing.

6. The method as recited in claim 4, wherein the step of removing forms chips from the core, the method further comprising the step of discharging chips formed during the step of removing, the step of discharging using suction to remove the chips.

7. The method as recited in claim 6, wherein the router has a suction channel extending from the centrally disposed opening in the disk, during the step of discharging, the chips being suctioned through the centrally disposed opening and through the suction channel.

8. The method as recited in claim 1, further comprising the steps of:
 providing a transparent disk on the router, the disk having a generally circular shape and a centrally disposed opening therein; and
 guiding the router with the disk during the step of rotating by the disk engaging an end of the roll.

9. The method as recited in claim 1, wherein the step of removing forms chips from the core, the method further comprising the step of discharging chips formed during the step of removing, the step of discharging using suction to remove the chips.

10. The method as recited in claim 1, further comprising the step of inserting a core plug into the core after the step of removing, an outermost face of the core plug being generally flush with the end of the core and the end of the roll.

11. A combination of a core and a device for trimming the core, the combination comprising:
 the core having an annular shape with a centrally disposed opening, a roll of paper being mounted on the core;
 the device for trimming having means for removing a portion of the core which extends longitudinally beyond the roll and means for discharging waste produced by the means for removing, the means for removing reducing the length of the core which extends longitudinally beyond the roll, the means for discharging using suction for removing waste produced by the means for removing;
 the means for removing including a router with a rotatable router bit mounted thereon, the router bit being engageable with the portion of the core extending longitudinally beyond the roll such that upon rotation of the bit, the portion of the core is chipped away, chips formed by the router bit being the waste which is removed from an area adjacent the bit by the means for discharging; and
 means for protecting the roll of paper from the router bit, the means for protecting comprising a collar mounted on the router bit, the collar being engageable with a side of the opening in the core when at least a part of the portion of the core is chipped away, the collar preventing the router bit from engaging the roll, the collar further guiding the router.

12. The combination as recited in claim 11, where the means for removing further comprises a disk mounted to the router, the disk having a generally circular shape and a centrally disposed opening therein, the router bit and collar extending through the centrally disposed opening in the disk, the disk guiding the router around the roll as the portion of the core is chipped away.

13. The combination as recited in claim 12, wherein the disk is transparent and wherein the means for discharging includes a vacuum connected to a suction channel, the suction channel extending beneath the disk away from the centrally disposed opening, waste being sucked through the centrally disposed opening in the disk and through the suction channel to thereby be discharged from the area adjacent the bit.

14. The combination as recited in claim 12, wherein the router bit is rotatable by the router to reduce the length of the core, the disk being nonrotatably mounted on the router and guiding the router during the removing of the portion of the core, the disk and an end of the core both having a generally circular shape.

* * * * *